April 12, 1932.     M. C. CARBONARO     1,854,105
APPARATUS FOR THE SUPPLY OF LIQUIDS
Filed May 29, 1930
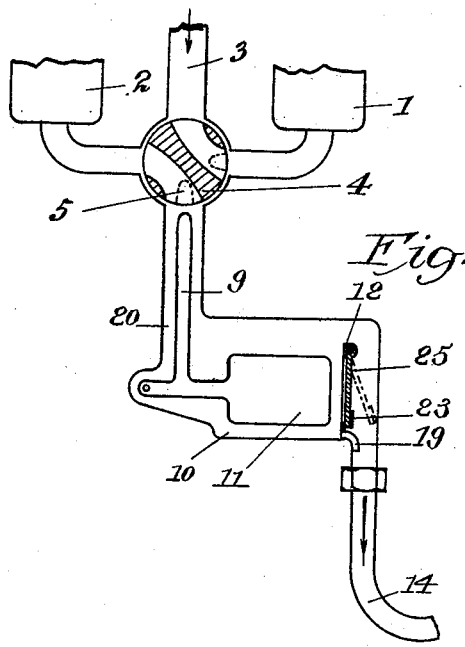
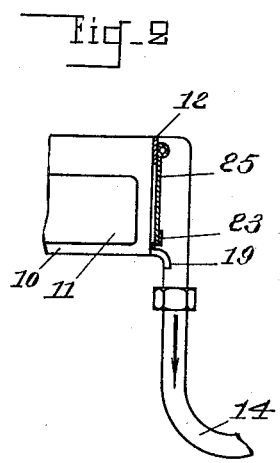
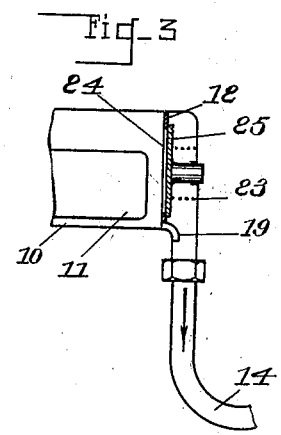
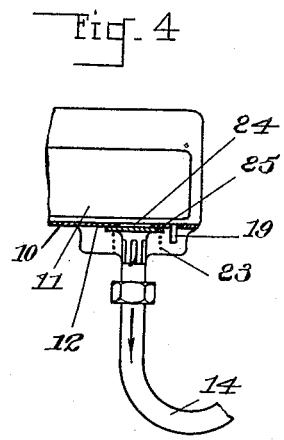
Inventor:
Marius C. Carbonaro,
By Edward Mason & Porter,
Attorneys.

Patented Apr. 12, 1932

1,854,105

UNITED STATES PATENT OFFICE

MARIUS CLEMENT CARBONARO, OF PARIS, FRANCE, ASSIGNOR TO SOCIETE ANONYME POUR TOUS APPAREILLAGES MECANIQUES, OF LEVALLOIS-PERRET, FRANCE

APPARATUS FOR THE SUPPLY OF LIQUIDS

Application filed May 29, 1930, Serial No. 457,144, and in France March 20, 1930.

In known apparatus for the supply of liquids, a float is located on the emptying conduit, and employed to hold the controlling device of the apparatus in the raised position, in which it will be prevented from any further operation as long as the float is raised by the outflowing liquid.

To oblige the said float to rise when the output of the apparatus is very small, a partition is disposed at the forward side of the float, which partition is pierced with a very small orifice and is adapted to retain the liquid, the cross section of the orifice being such that its output is less than the output of the apparatus.

The use of the said partition offers the drawback of a loss of pressure in the emptying conduit, the flow of the liquid being slowed to an excessive degree, thus reducing the output of the apparatus to a great extent, and the apparatus is also held in position until the float has descended to its lowest point.

The present invention obviates all such drawbacks, and consists in the substitution, for at least a part of the said partition, of a movable device such as a flap or clack valve, which will move aside when a sufficient pressure is exerted upon it by the outflowing liquid, and which will return into position when this pressure is sufficiently reduced. Such pressure may be static or dynamic, or it may be at the same time both static and dynamic.

The accompanying drawings show four different embodiments of the invention.

The dispensing device comprises two reservoirs 1 and 2, a filling conduit 3 and a discharge conduit 20. A reversing valve 4 permits placing one of the reservoirs 1 or 2 in communication with the discharge conduit 20, and the other reservoir 2 or 1 in communication with the filling conduit 3. To prevent the reversal of the valve 4 before the completion of the discharge of the reservoir being discharged, in the chamber 10 of the discharge conduit 20 and in front of the flexible tube 14 which is an extension of a conduit 20, is located a float 11 which carries a bolt 9 which may be engaged in one of the notches 5 of the valve 4. To permit the raising of the float 11 during the discharge, the chamber 10 is closed at least partially by a partition wall 12 which retains the liquid in the chamber 10.

In the known apparatus, the wall 12 has a fixed position, and the liquid is discharged through the orifice 19 or over the upper part of the wall 12 which has the form of a weir or a delivery gate (Figure 1).

In the construction shown in Figure 1, the wall 12 is replaced by a flap 25 which is pivotally mounted on an axle 22 and is weighted by an additional mass 23, preferably adjustable.

In the construction shown in Figure 2, the disposition is the same as in the preceding case, but the axle 22 is mounted on a member secured to the upper part of the chamber 10, so that the wall 12 forms a closing partition in the float chamber, and the liquid cannot flow over it.

According to the construction shown in Figure 3, the wall 12 is apertured at 24, and this aperture can be closed by a clack valve 25 controlled by a spring 23 which is calibrated and is preferably adjustable.

The apparatus shown in Figure 4 comprises a wall 12, which is no longer vertical but horizontal; the aperture 24 can be closed by the clack valve 25 controlled by the spring 23.

In all of the apparatus herein above described, the operation is as follows. When the discharge takes place, the liquid flows through the orifice 19, but as this orifice is narrow, the level of the liquid will rise in the chamber 10; the float 11 will rise, thus holding the said apparatus in position. When the chamber 10 is entirely filled by an abundant supply of liquid, the flap or the valve will be lifted, thus increasing the flow section for the liquid, and thus the liquid will be discharged in a greater amount. In the case of Figure 1, the liquid may if necessary circulate over the upper edge of the wall 12 which thus forms a weir or gate. At the end of the discharging operation, it is observed in practice that under the effect of the suction of the liquid in the flexible conduit 14, the said valve 25 will be held open in spite of the spring 23, and possibly also by its own weight, until the chamber 10 is practically emptied. The float 11 then rapidly descends and at once releases the apparatus.

Having now particularly described and ascertained the nature of my invention and in what manner the same is to be performed, I declare that what I claim is:

1. Liquid dispensing device comprising at least one reservoir, a filling conduit, a discharge conduit, a reversing element for alternate placing the reservoir in communication with the filling conduit and with the discharge conduit, a wall located in the discharge conduit, a float disposed in the discharge conduit between the reversing element and the wall, means actuated by the float for latching the said reversing element, a part of the said wall being movable, and means for moving the movable part of the said wall into the closed position.

2. Dispensing device according to claim 1, in which the movable portion of the wall is formed by a flap valve, and a pivot for the said valve is mounted on said wall.

3. Dispensing device according to claim 1, in which the movable portion of the said wall is formed by a flap valve, and including a pivot for the said valve on said wall, and in which means for moving the movable part of the said wall into closed position comprises a weight.

4. Dispensing device according to claim 1, in which the means for moving the movable part of the said wall into the closed position comprises a spring.

5. Dispensing device according to claim 1, in which the means for bringing the movable part of the said wall into the closed position comprises a spring and means for regulating the action of said spring.

6. Dispensing device according to claim 1, in which the movable part of the said wall is formed by a clack valve.

7. Dispensing device according to claim 1, in which the float is disposed in a chamber comprising a part of the discharge conduit and the said wall forms the bottom of the said chamber.

In testimony whereof I have signed this specification.

MARIUS CLEMENT CARBONARO.